United States Patent
Zolla et al.

(10) Patent No.: US 12,094,499 B1
(45) Date of Patent: Sep. 17, 2024

(54) CAP LAYER ABLE TO BE REACTIVE ION ETCHED FOR RSB DFL READ ELEMENTS

(71) Applicant: Western Digital Technologies, Inc., San Jose, CA (US)

(72) Inventors: Howard Gordon Zolla, Los Gatos, CA (US); Rong Cao, Pleasanton, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 18/349,803

(22) Filed: Jul. 10, 2023

Related U.S. Application Data

(60) Provisional application No. 63/459,533, filed on Apr. 14, 2023.

(51) Int. Cl.
- *G11B 5/39* (2006.01)
- *G11B 5/11* (2006.01)
- *G11B 5/31* (2006.01)
- *G11B 5/10* (2006.01)

(52) U.S. Cl.
CPC ............ *G11B 5/3909* (2013.01); *G11B 5/112* (2013.01); *G11B 5/3912* (2013.01); *G11B 5/3932* (2013.01); *G11B 5/102* (2013.01); *G11B 5/3163* (2013.01); *G11B 5/3954* (2013.01)

(58) Field of Classification Search
None
See application file for complete search history.

(56) References Cited

U.S. PATENT DOCUMENTS

| | | |
|---|---|---|
| 9,099,122 B2 | 8/2015 | Jiang et al. |
| 9,147,404 B1 | 9/2015 | Luo et al. |
| 9,384,763 B1 | 7/2016 | Liu et al. |
| 9,449,621 B1 | 9/2016 | Mauri et al. |
| 9,922,672 B1 | 3/2018 | Mauri et al. |
| 11,087,785 B1 | 8/2021 | Mao et al. |
| 11,127,422 B1 | 9/2021 | Liu et al. |
| 2006/0132969 A1 | 6/2006 | Jayasekara |
| 2012/0268847 A1* | 10/2012 | Dimitrov et al. ...... G11B 5/398 360/320 |

(Continued)

OTHER PUBLICATIONS

W. P. Jayasekara et al., "Etching of spin valve capping layers for sensor stabilization applications," 2003 IEEE International Magnetics Conference (INTERMAG), Boston, MA, USA, 2003. vol. 39, No. 5, pp. 2381-2383, Sep. 2003.

*Primary Examiner* — Craig A. Renner
(74) *Attorney, Agent, or Firm* — PATTERSON + SHERIDAN, LLP

(57) ABSTRACT

The present disclosure generally relates to a dual free layer (DFL) read head. In one embodiment, a dual free layer (DFL) read head, comprising: a tunnel magneto resistance (TMR) sensor disposed at a media facing surface (MFS); soft bias (SB) side shields disposed adjacent to the TMR sensor at the MFS; and a rear soft bias (RSB) disposed adjacent to the TMR sensor recessed from the MFS. The RSB has a nonmagnetic cap, the nonmagnetic cap comprising: a first nonmagnetic cap layer; and a second nonmagnetic cap layer, wherein an etch selectivity of the first nonmagnetic cap layer to the second nonmagnetic cap layer is a ratio of a:b in a first chemistry and a ratio of x:y in a second chemistry, wherein a is greater than b, and y is greater than x, and the second nonmagnetic cap layer is disposed on the first nonmagnetic cap layer.

20 Claims, 13 Drawing Sheets

(56) References Cited

U.S. PATENT DOCUMENTS

| | | | |
|---|---|---|---|
| 2014/0057133 A1* | 2/2014 | Boonstra | G11B 5/3932 |
| | | | 428/810 |
| 2015/0002961 A1 | 1/2015 | Keener et al. | |
| 2016/0163338 A1* | 6/2016 | Ho et al. | G11B 5/3909 |
| | | | 360/75 |

\* cited by examiner

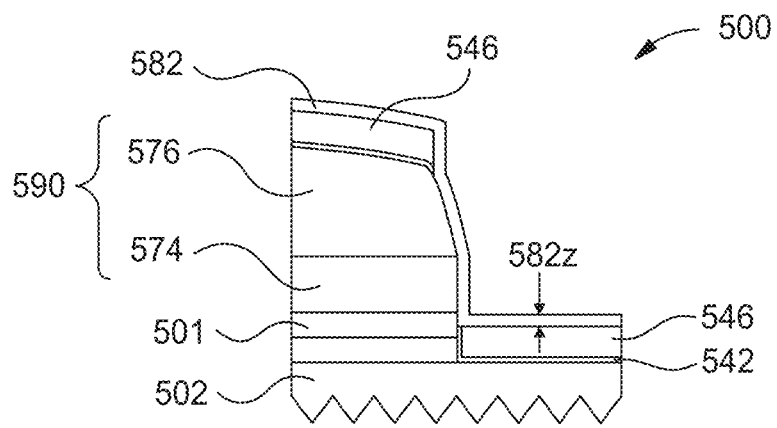
FIG. 5E
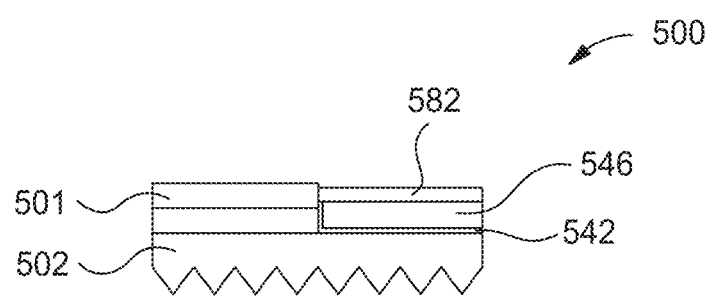
FIG. 5F
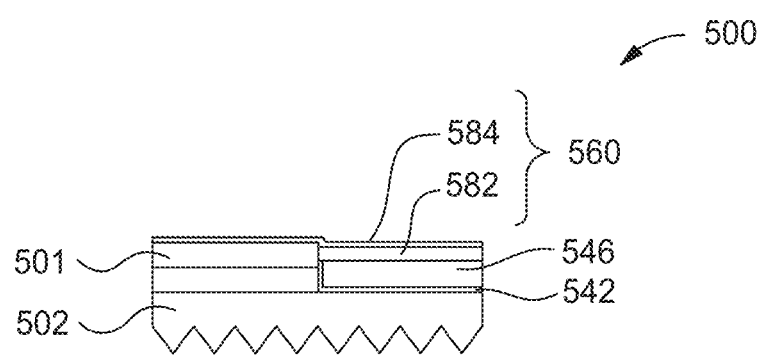
FIG. 5G
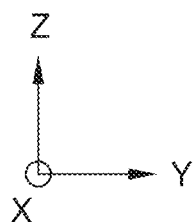

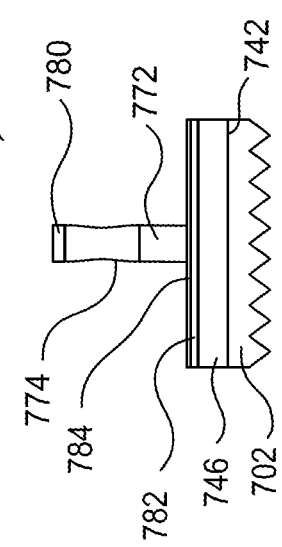
FIG. 7C
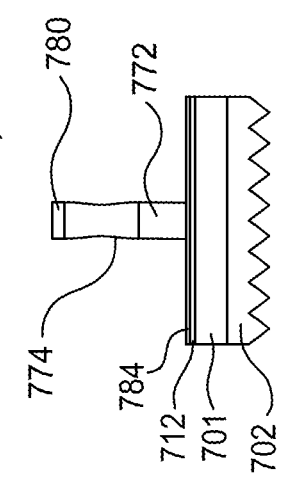
FIG. 7D
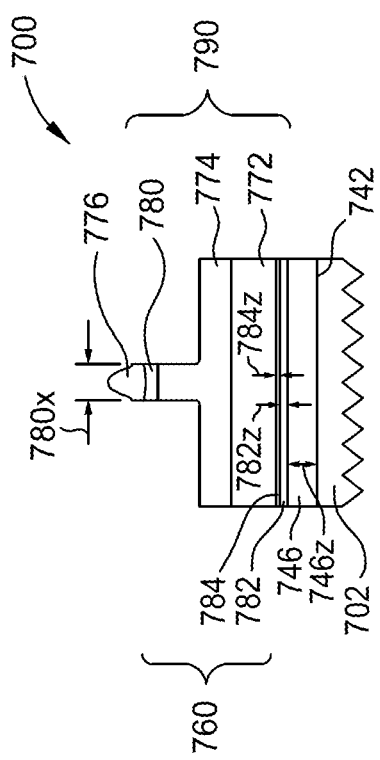
FIG. 7A
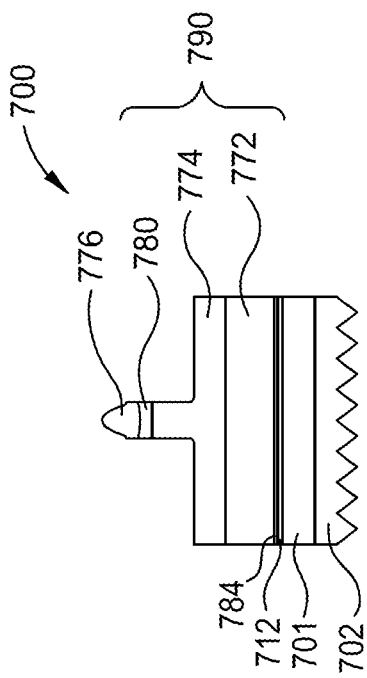
FIG. 7B
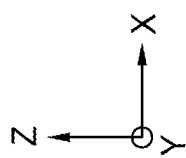

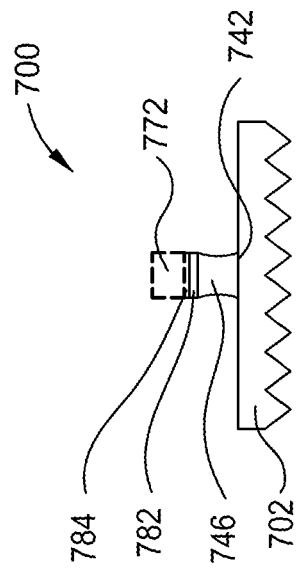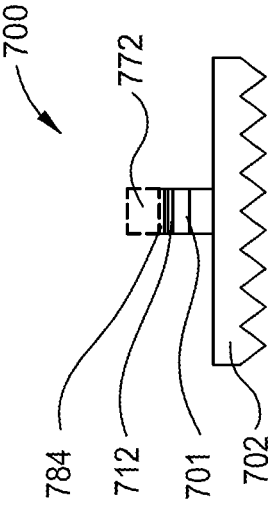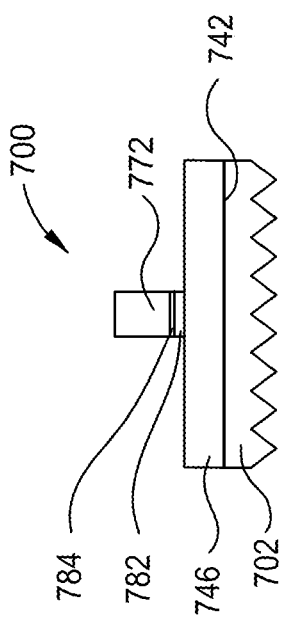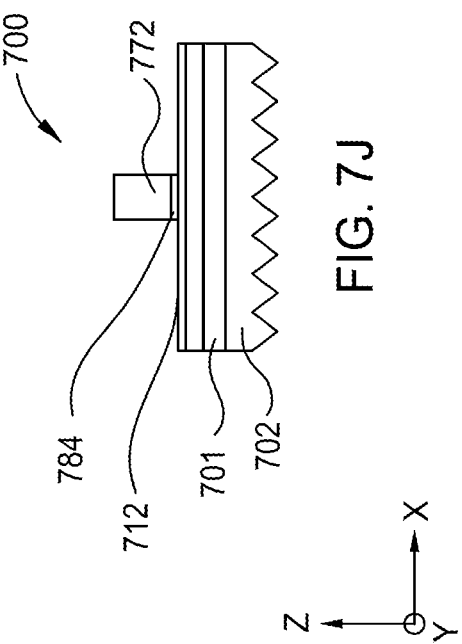
FIG. 7I
FIG. 7K
FIG. 7J
FIG. 7L

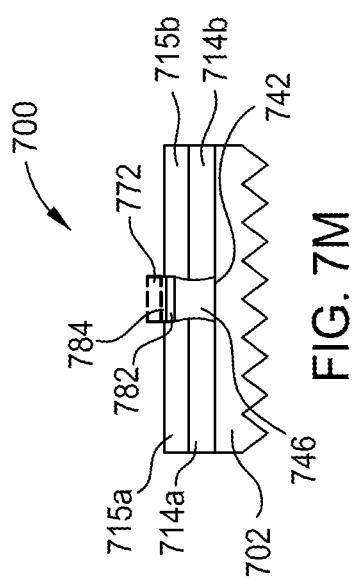
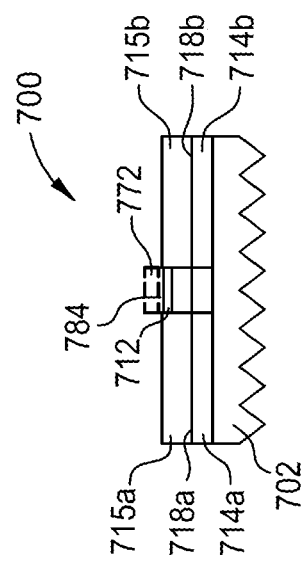
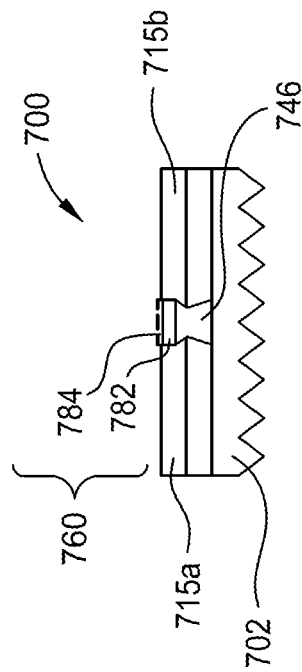
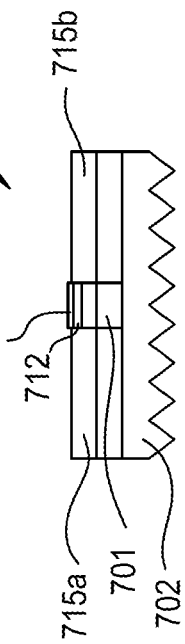

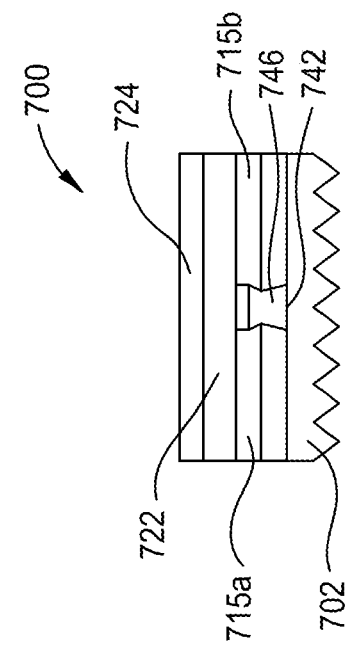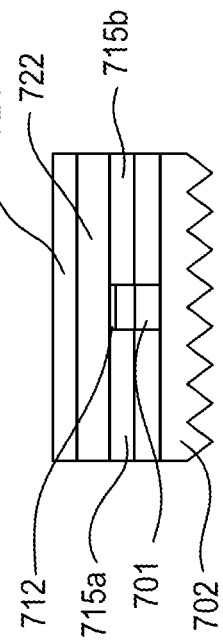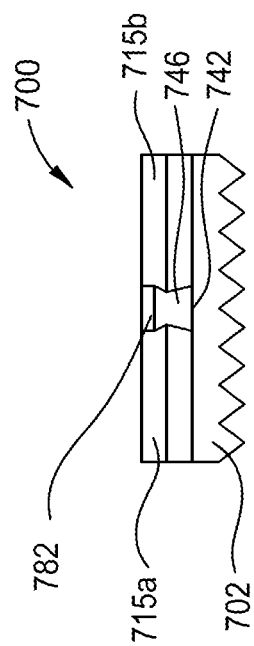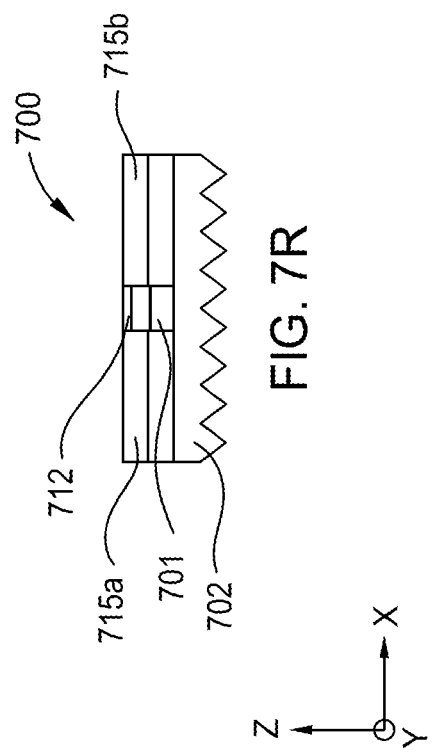

CAP LAYER ABLE TO BE REACTIVE ION ETCHED FOR RSB DFL READ ELEMENTS

CROSS-REFERENCE TO RELATED APPLICATIONS

This application claims benefit of U.S. Provisional Patent Application Ser. No. 63/459,533, filed Apr. 14, 2023, which is herein incorporated by reference.

BACKGROUND OF THE DISCLOSURE

Field of the Disclosure

Embodiments of the present disclosure generally relate to a dual free layer (DFL) read head and methods of forming thereof.

Description of the Related Art

Read heads, which are configured to read data from a media, generally comprise two free layers to be dual free layer (DFL) readers or sensors. In DFL reader operation, the two free layers are individually stabilized longitudinally by an anti-ferromagnetically coupled (AFC) soft bias (SB) and biased transversally by a permanent magnet or a rear hard bias (RHB) structure from the stripe back edge of the sensor. Recently, the track width of the dual free layer read heads have been decreasing. However, the smaller track width of the DFL read heads can limit performance of the DFL read heads, as the signal-to-noise ratio may degrade.

Moreover, a transverse bias field of DFL read heads is determined by the remnant magnetization (Mr) times thickness (t) product (i.e., Mr*t) of the RHB structure. Since a saturation magnetization, Ms, and thus, the Mr of the RHB is quite limited (e.g., as compared to the Ms of a rear soft bias (RSB)), a thicker RHB is generally required to achieve the desired transverse bias field. However, the thicker RHBs may certainly result in a larger undesirable topography along the stripe direction, and in turn limit DFL readers for TDMR applications. In addition, a large RHB comprising a granular material may result in an unintended read-out signal polarity flip due to the RHB biasing direction flip, further negatively impacting the overall performance and reliability of the DFL read heads. Furthermore, the granular nature of a large sized RHB certainly determines the transverse bias field with intrinsic non-uniformity and the limitation to read heads with smaller track widths for higher areal recording density due to significant performance degradations. The RSB is a transverse biasing layer that is positioned behind a tunnel magneto resistance (TMR) sensor. Where the RHB is intrinsically stabilized by magnetic coercivity (Hc), RSB is stabilized by its needle-like shape.

In the formation of the DFL reader, the RSB is currently formed with a tantalum (Ta) cap. This metal is utilized because Ta is non-magnetic. Ta is also utilized for its ability to withstand milling, which maintains the magnetic separation from the laminated shared shield (LSS) and laminated second shield (LS2). The LSS is between the upper and lower elements in TDMR applications. The LS2 is used in both TDMR applications and in single reader designs. One drawback of utilizing Ta as a cap is that the mill needs to penetrate the Ta cap prior to milling the RSB, which makes it difficult to mill through both the RSB and the TMR in the same process. Another drawback of the Ta cap is that the RSB cannot be made of harder-to-mill materials, which are needed for higher magnetic moment or magnetic saturation RSBs.

Therefore, there is a need in the art for an improved cap for an RSB structure.

SUMMARY OF THE DISCLOSURE

The present disclosure generally relates to a dual free layer (DFL) read head and methods of forming thereof. In one embodiment, a dual free layer (DFL) read head, comprising: a tunnel magneto resistance (TMR) sensor disposed at a media facing surface (MFS); soft bias (SB) side shields disposed adjacent to the TMR sensor at the MFS; and a rear soft bias (RSB) disposed adjacent to the TMR sensor recessed from the MFS. The RSB having a nonmagnetic cap, the nonmagnetic cap comprising: a first nonmagnetic cap layer, wherein the first nonmagnetic cap layer can be reactive ion etched with a first chemistry; and a second nonmagnetic cap layer, wherein the second nonmagnetic cap layer can be reactive ion etched with a second chemistry, but not with the first chemistry, and the second nonmagnetic cap layer is disposed on the first nonmagnetic cap layer.

In another embodiment, a method of forming a dual free layer (DFL) read head comprises forming a rear soft bias (RSB) portion, the RSB portion comprising a nonmagnetic cap; depositing a stencil over the nonmagnetic cap, the stencil comprising a dry patterned transfer layer and a hard mask; shaping the stencil to define a width of the RSB; removing a portion of the nonmagnetic cap; and removing the stencil.

In yet another embodiment, a dual free layer (DFL) read head, comprising: a tunnel magneto resistance (TMR) sensor disposed at a media facing surface (MFS); soft bias (SB) side shields disposed adjacent to the TMR sensor at the MFS; and a rear soft bias (RSB) disposed adjacent to the TMR sensor recessed from the MFS. The RSB having a nonmagnetic cap, the nonmagnetic cap comprising: a first nonmagnetic cap layer; and a second nonmagnetic cap layer, wherein an etch selectivity of the first nonmagnetic cap layer to the second nonmagnetic cap layer is a ratio of a:b in a first chemistry and a ratio of x:y in a second chemistry, wherein a is greater than b, and y is greater than x, and the second nonmagnetic cap layer is disposed on the first nonmagnetic cap layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 5A-5G illustrate cross-sectional views of various stages of a method of forming a DFL read head, in accordance with one or more embodiments of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a dual free layer (DFL) read head and methods of forming thereof. In one embodiment, a dual free layer (DFL) read head, comprising: a tunnel magneto resistance (TMR) sensor disposed at a media facing surface (MFS); soft bias (SB) side shields disposed adjacent to the TMR sensor at the MFS; and a rear soft bias (RSB) disposed adjacent to the TMR sensor recessed from the MFS. The RSB having a nonmagnetic cap, the nonmagnetic cap comprising: a first nonmagnetic cap layer; and a second nonmagnetic cap layer, wherein an etch selectivity of the first nonmagnetic cap layer to the second nonmagnetic cap layer is a ratio of a:b in a first chemistry and a ratio of x:y in a second chemistry, wherein a is greater than b, and y is greater than x, and the second nonmagnetic cap layer is disposed on the first nonmagnetic cap layer.

Figure 1:
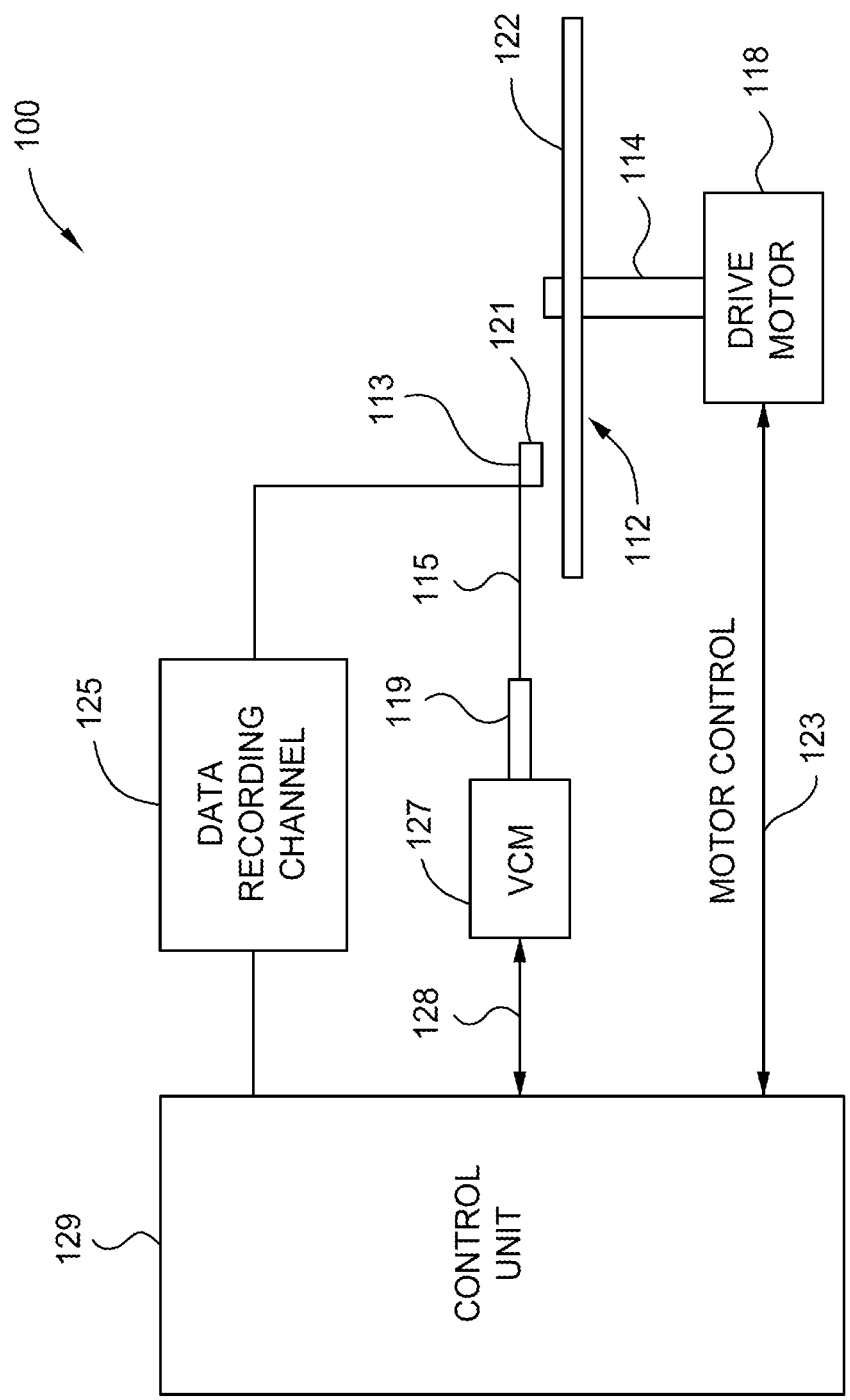
FIG. 1 illustrates a disk drive embodying this disclosure.

FIG. 1 is a schematic illustration of a magnetic recording device 100, according to one implementation. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnetic recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129. Although not shown, the present disclosure may also be incorporated into a drive with a plurality of VCMs or actuators.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation. In another embodiment, a negative pressure air bearing arrangement (not shown) may be utilized.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
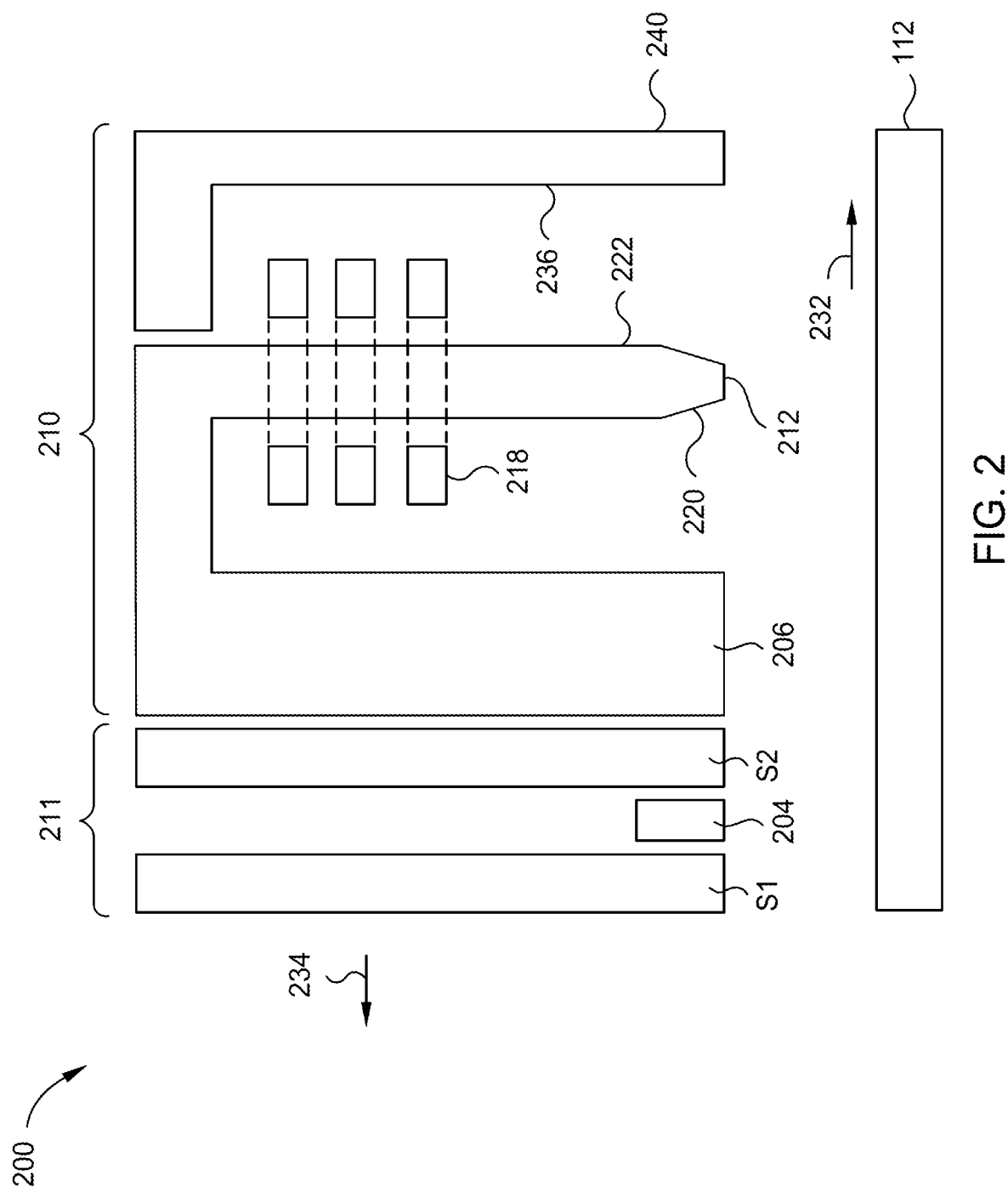
FIG. 2 is a fragmented, cross-sectional side view through the center of a read/write head facing a magnetic media, according to one embodiment.

FIG. 2 is a fragmented, cross sectional side view through the center of a read/write head 200 facing the magnetic media 112, according to one embodiment. In other embodiments, a different read/write head configuration may be utilized. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. The read/write head 200 may be an energy-assisted magnetic recording (EAMR) head or a perpendicular magnetic recording (PMR) head. In FIG. 2, the magnetic media 112 moves past the write head 210 in the direction indicated by the arrow 232 and the read/write head 200 moves in the direction indicated by the arrow 234.

In some embodiments, the magnetic read head 211 is a SOT-based reader 204 located between the shields S1 and S2. In other embodiments, the magnetic read head 211 is a magnetoresistive (MR) read head that includes an MR sensing element 204 located between MR shields S1 and S2. In some other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, and a coil 218 that excites the main pole 220. The coil 218 may have a "pancake" structure which winds around a back-contact between the main pole 220 and the return pole 206, instead of a "helical" structure shown in FIG. 2. A trailing gap (not shown) and a leading gap (not shown) may be in contact with the main pole and a leading shield (not shown) may be in contact with the leading gap. A recording magnetic field is generated from the main pole 220 and the trailing shield 240 helps making the magnetic field gradient of the main pole 220 steep. The main pole 220 may be a magnetic material such as a FeCo alloy. The main pole 220 may include a trailing surface 222 which may be parallel to a leading surface 236 of the trailing shield 240. The main pole 220 may be a tapered write pole (TWP) with a trailing edge taper (TET) configuration. In one embodiment, the main pole 220 has a saturated magnetization (Ms) of 2.4 T and a thickness of about 300 nanometers (nm). The main pole 220 may comprise ferromagnetic materials, typically alloys of one or more of Co, Fe, and Ni. The trailing shield 240 may be a magnetic material such as NiFe alloy. In one embodiment, the trailing shield 240 has an Ms of about 1.2 T to about 1.6 T.

Figure 3A:
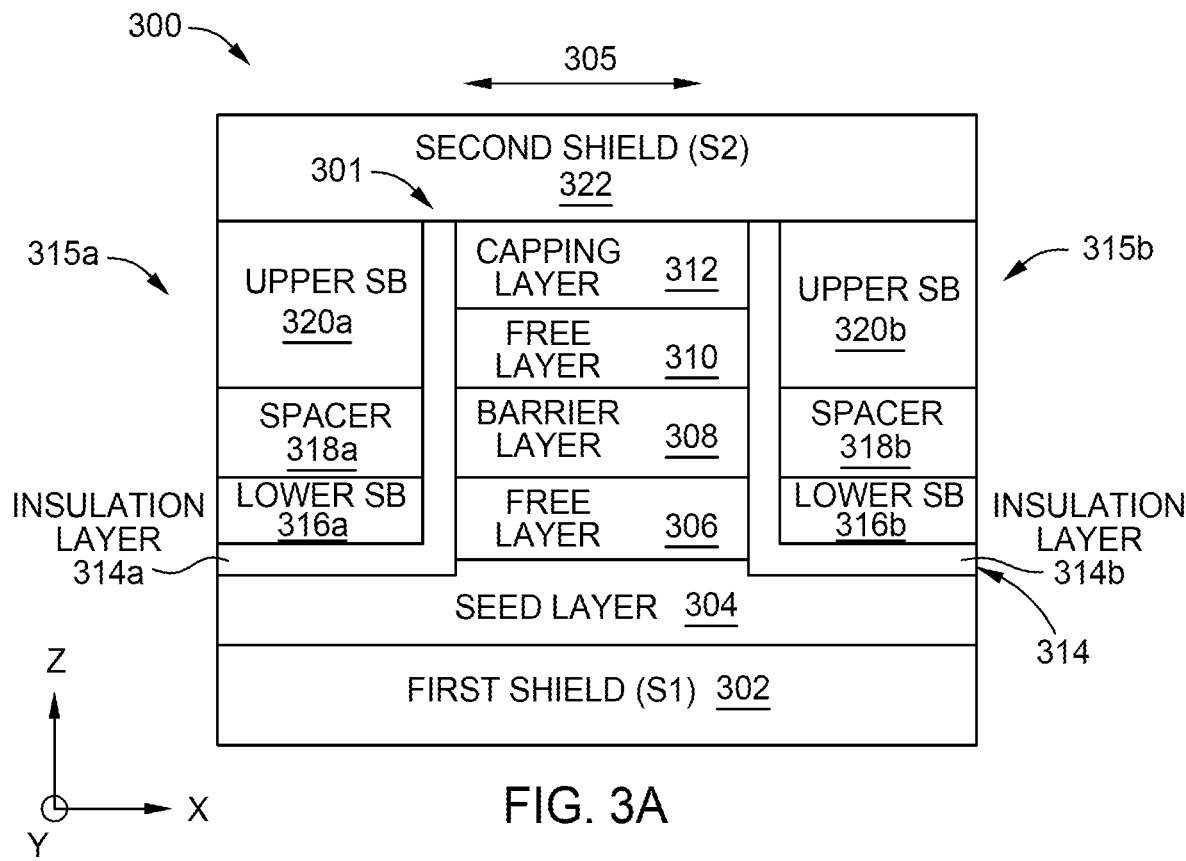
FIGS. 3A-3B illustrate a dual free layer (DFL) read head, according to one embodiment.
Figure 3B:
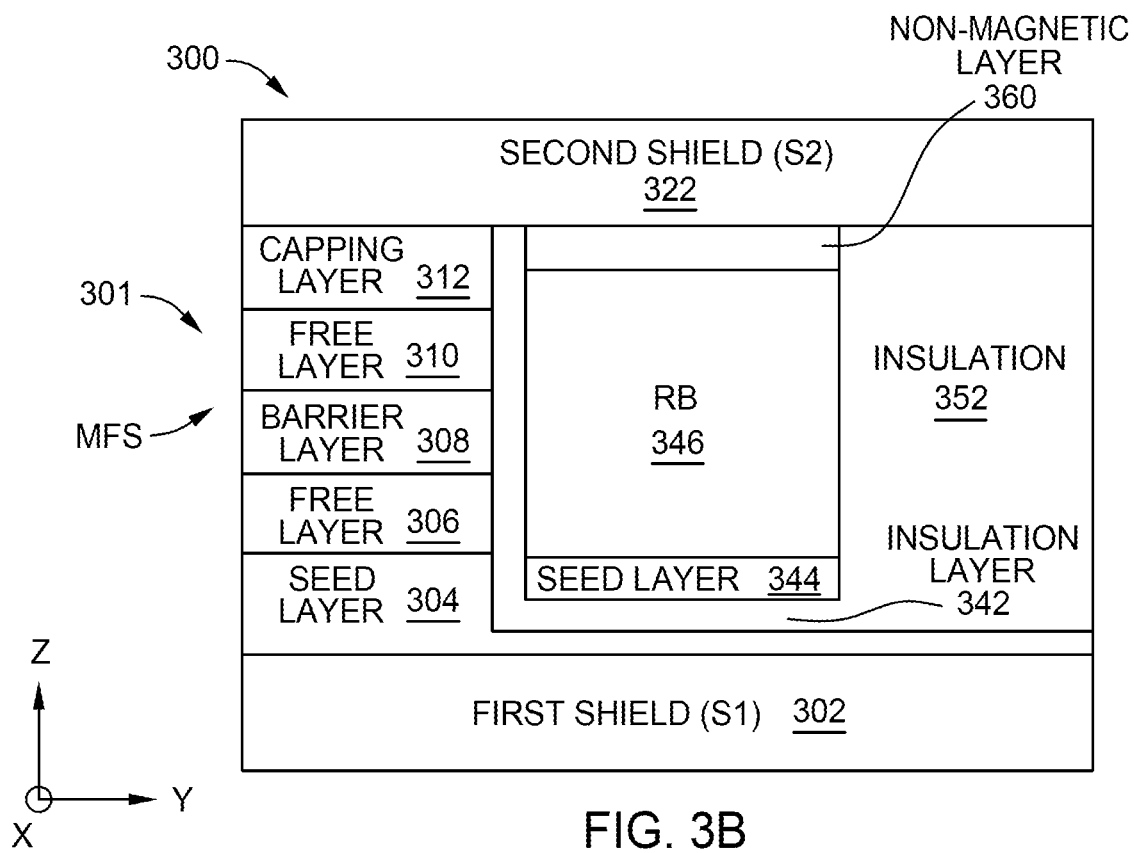

FIGS. 3A-3B illustrate a dual free layer (DFL) read head 300, according to one embodiment. FIG. 3A illustrates a media facing surface (MFS) view of the DFL read head 300, and FIG. 3B illustrates a cross-sectional view of the DFL read head 300. The DFL read head 300 may correspond to, or be a part of, the magnetic head assembly 121 described in FIG. 1. The DFL read head 300 may correspond to, or be a part of, the read/write head 200 described in FIG. 2, such as the magnetic read head 211. The DFL read head 300 may be formed as described below in FIG. 4, and/or in FIGS. 5A-5G, and/or in FIG. 6, and/or in FIGS. 7A-7T.

The DFL read head 300 includes a first shield (S1) 302, a seed layer 304, a first free layer (FL) 306, a barrier layer 308, a second FL 310, a capping layer 312, and a second shield (S2) 322. The second shield 322 may be a laminated shared shield (LSS). The seed layer 304, the first FL 306, the barrier layer 308, the second FL 310 and the capping layer 312 form a DFL read sensor 301 of the DFL read head 300. The DFL read sensor 301 may be a tunnel magneto resistance (TMR) sensor. The DFL read sensor 301 has a track width 305 in the x-direction of about 10 nm to 30 nm. The seed layer 304 includes a material selected from the group that includes tantalum (Ta), ruthenium (Ru), titanium (Ti), cobalt hafnium (CoHf), and combinations thereof. In one embodiment, the barrier layer 308 comprises magnesium oxide (MgO). The first FL 306 and the second FL 310 may each individually comprise cobalt iron (CoFe), cobalt boron (CoB), cobalt iron boron (CoFeB), cobalt hafnium (CoHf), cobalt iron hafnium (CoFeHf) and combinations thereof. The capping layer 312 may comprise Ta, Ru, Ti, CoHf, and combinations thereof.

The DFL read head 300 further includes a first synthetic antiferromagnetic (SAF) soft bias (SB) side shield 315a that includes a first lower SB layer 316a, a first spacer 318a such as ruthenium, and a first upper SB layer 320a and a second SAF SB side shield 315b that includes a second lower SB layer 316b, a second spacer 318b such as ruthenium, and a second upper SB layer 320b. The SAF SB layers 316a, 316b, 320a, 320b may comprise NiFe and/or CoFe and combinations thereof. The magnetic moments or magnetization directions for the first FL 306 and the second FL 310 may be antiparallel due to the antiparallel biasing from the SAF SB side shields 315a, 315b (collectively referred to as SAF SB side shields 315). The DFL read sensor 301 is insulated from SAF SB side shields 315 by insulation layers 314a, 314b (collectively referred to as insulation layers 314). The insulation layers 314 may be aluminum oxide (AlOx), magnesium oxide (MgO) or any other suitable insulation material, and combinations thereof.

As shown in FIG. 3B, the DFL read head 300 further includes a rear bias (RB) 346 and a second insulation layer 342. The RB 346 is isolated electrically by a second insulation layer 342 from the DFL read sensor 301 and the first shield 302. The second insulation layer 342 may be aluminum oxide (AlOx), magnesium oxide (MgO), any other suitable insulation material, and combinations thereof. A bottom portion of the RB 346 disposed adjacent to the first shield 302 is spaced from the second insulation layer 342 by a seed layer 344, where the seed layer 344 has a same width in the z-direction as the RB 346. The RB 346 is further insulated by the first insulation layer 352 on the other side away from the DFL read sensor 301 (e.g., recessed from the MFS). The first insulation layer 352 may be aluminum oxide (AlOx) or any other suitable insulation material. The RB 346 generates a magnetic field pointing away from the insulation layer 352 and towards the following layers: the first FL 306, the barrier layer 308, the second FL 310, and the capping layer 312. The RB 346 is magnetically decoupled from the second shield 322 by inserting a nonmagnetic layer 360 between RB 346 and the second shield 322. The RB 346 may comprise CoPt, and in such cases, referred to as rear hard bias (RHB). The RB 346 may also comprise NiFe and/or CoFe and combinations thereof, and in such cases, referred to as rear soft bias (RSB). Generally, both the material of the RHB 346 and the material of the RSB 346 or the SAF SB side shields 315 are polycrystalline. As such, the granular nature of the material of the RB 346 determines the degree of the intrinsic non-uniformity of the transverse bias fields depending on its magneto-crystalline anisotropy.

The RB 346 has a magnetization direction (e.g., in the y-direction) perpendicular to a magnetization direction (e.g., in the x-direction) of the first FL 306 and the second FL 310. Before the magnetic recording head comprising the DFL read head 300 is shipped from the production line, the RB 346 typically needs to be magnetically initialized by a magnetic field in the y-direction.

Figure 4:
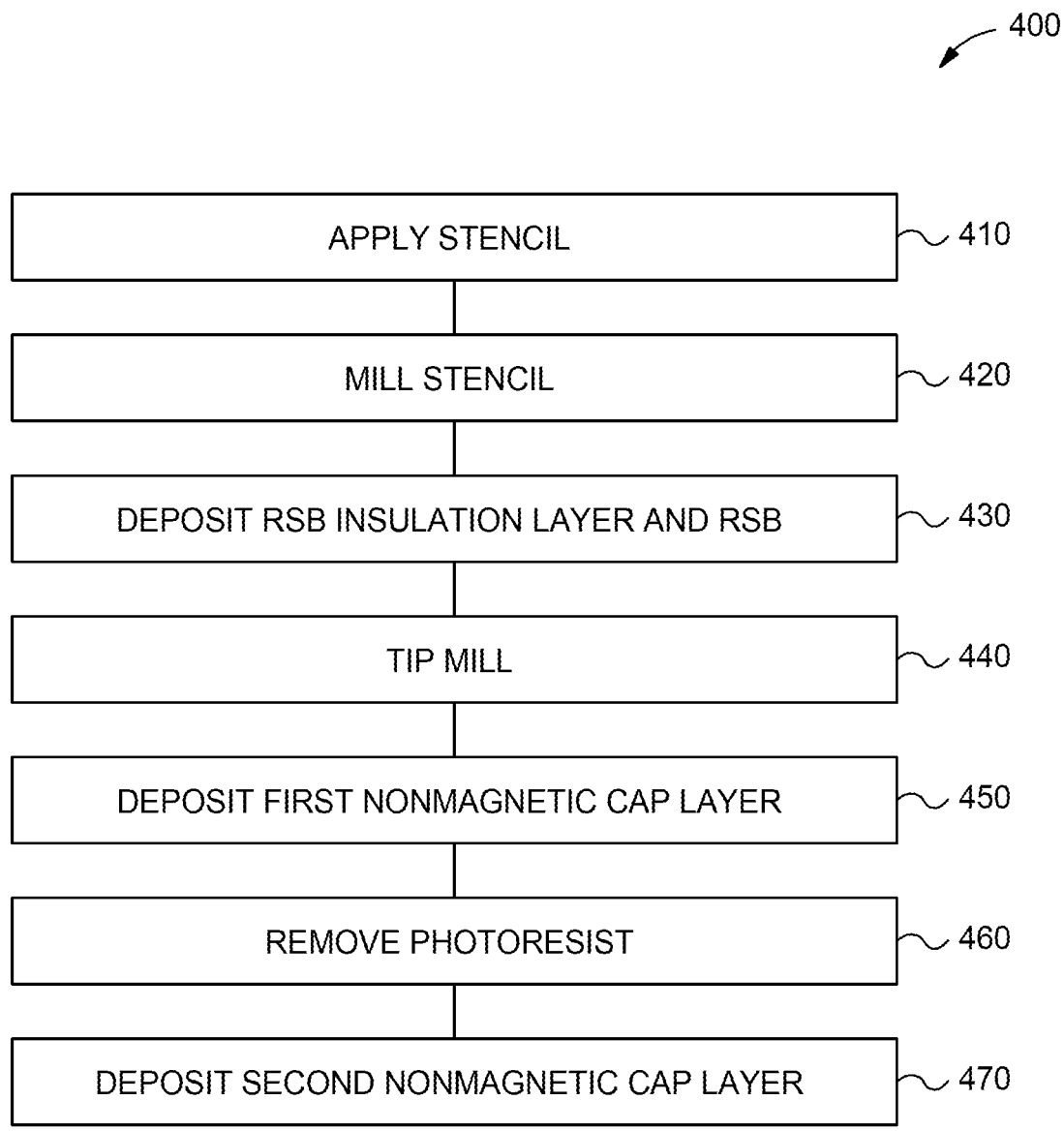
FIG. 4 is a flowchart illustrating a method of forming a DFL read head, according to one embodiment.

FIG. 4 is a flowchart illustrating a method 400 of forming a DFL read head 500, according to one embodiment. FIGS. 5A-5G illustrate cross-sectional views of various stages of forming a DFL read head 500 according to the method 400, in accordance with one or more embodiments of the present disclosure. The DFL read head 500 may be the DFL read head 300 of FIGS. 3A-3B. As such, the TMR sensor 501 may be the DFL sensor 301, the lower shield 502 may be the first shield 302, the RSB 546 may be the RB 346, the RSB insulation layer 542 may be the second insulation layer 342, and the nonmagnetic cap 560 may be the nonmagnetic layer 360. The DFL read head 500 may correspond to, or be a part of, the read/write head 200 described in FIG. 2, such as the magnetic read head 211.

Figure 5A:
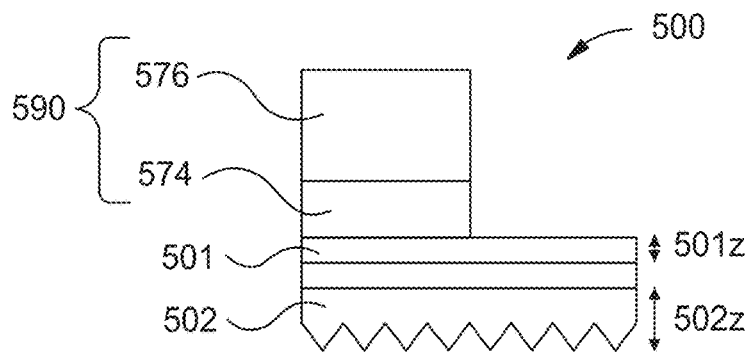

In operation 410 of method 400, a stencil 590 comprising a photoresist 576 and a dry patterned transfer layer 574 is applied over the TMR sensor 501 as shown in FIG. 5A. Without being limited to theory, the stencil covers the TMR sensor 501 such that, in later operations, the deposited materials are deposited on a lower shield 502 and not the TMR sensor 501. It is noted that the seed layer (depicted as seed layer 304 in FIGS. 3A-3B), which is between the lower shield 502 and the TMR sensor 501, is not shown in FIGS. 5A-5G. It is also noted that the capping layer (depicted as capping layer 312 in FIGS. 3A-3B), which is between the dry patterned transfer layer 574 and the TMR sensor 501, is not shown in FIGS. 5A-5G.

The photoresist 576 may be a TIS193IL-A01 manufactured by Fuji Film Electronic Materials.

The dry patterned transfer layer 574 may be a polyimide such as Durimide™ or polymethyl methacrylate (PMMA).

The thickness 501z of the TMR sensor 501 may range from 10 nm to 30 nm. The TMR sensor 501 may have the same composition as the DFL sensor 301.

In embodiments where the lower shield 502 is used in a lower device or in a single reader device, the thickness 502z of the lower shield 502 may range from 200 nm to 2000 nm. In embodiments where the lower shield 502 is used in an upper reader device in a TDMR head, the thickness 502z may range from 20 nm to 100 nm. The lower shield 502 may have the same composition as the first shield 302.

Figure 5B:
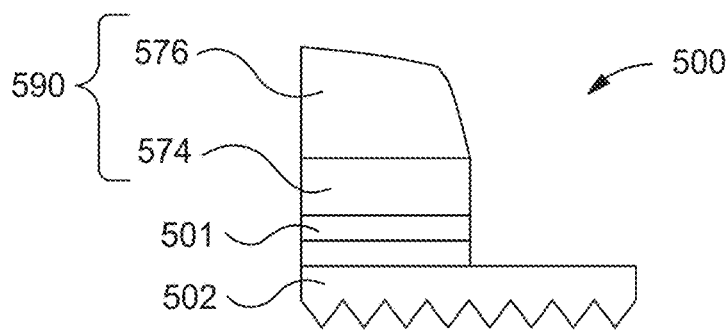

In operation 420, the DFL read head 500 is milled as shown in FIG. 5B. In one embodiment which may be combined with other embodiments, the DFL read head 500 is milled via an ion mill. Operation 420 removes the exposed TMR sensor 501 (i.e. the portion of the TMR sensor 501 that is not underneath the stencil 590) to define the width of the TMR sensor 501 in the y-direction.

Figure 5C:
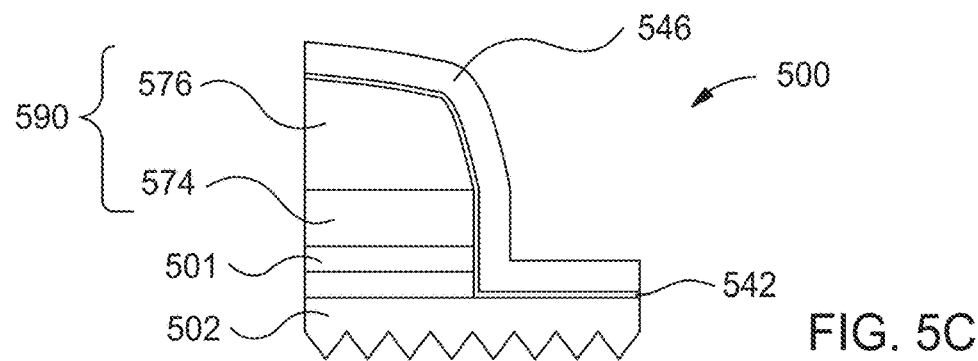

An RSB insulation layer 542 and an RSB 546 are deposited in operation 430. As shown in FIG. 5C, during this deposition, the RSB insulation layer 542 and the RSB 546 are applied to cover both the stencil 590 and the lower shield 502.

The thickness 546z of the RSB 546 may range from 10 nm to 30 nm. In one embodiment which may be combined with other embodiments, the RSB 546 may have the same thickness 546z as the TMR sensor 501. The RSB 546 may be the same composition as the RB 346.

The thickness of the RSB insulation layer 542 in the z-direction may range from 1 to 5 nm. The RSB insulation layer 542 may be the same composition as the second insulation layer 342.

Figure 5D:
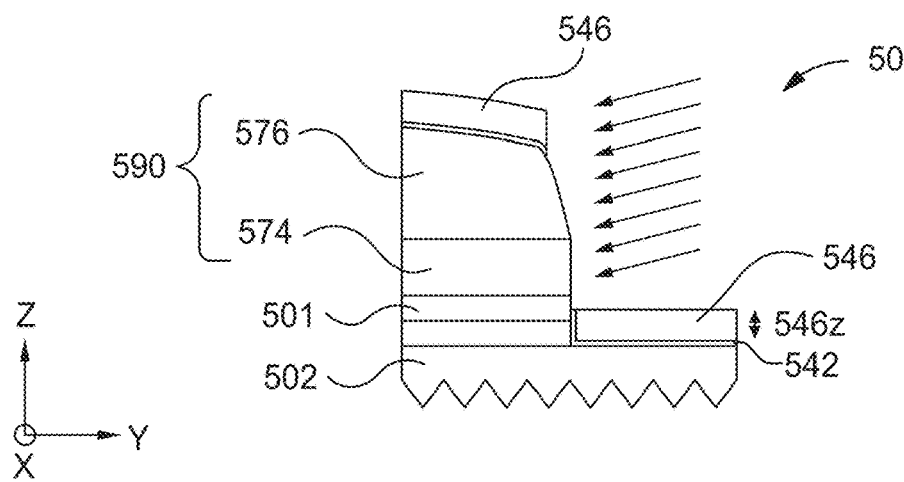

In FIG. 5D, a tip mill is utilized in operation 440. The tip mill removes the RSB insulation layer 542 and the RSB 546 from the side of the stencil 590 adjacent to the photoresist 576 and the dry patterned transfer layer 574.

In operation 450, a first nonmagnetic cap layer 582 is deposited on the remaining portion of the RSB 546 and the exposed side wall of the photoresist 576 and the dry patterned transfer layer 574.

The thickness 582z of the first nonmagnetic cap layer 582 may range from 1 nm to 10 nm. The first nonmagnetic cap layer 582 may be ruthenium (Ru), carbon (C), or any other material that may be removed via a reactive ion etch with a first chemistry. In some embodiments, an etch-stop layer (not shown) may be deposited prior to the deposition of the first nonmagnetic cap layer 582. The etch stop layer may be tantalum (Ta), a nitride, an oxide, or other material that is etched with a different chemistry than the first chemistry. The thickness of the etch stop layer may range from 5 Å to 30 Å. In one embodiment, the first nonmagnetic cap layer 582 is ruthenium and the etch stop layer is tantalum with a thickness of 10 Å.

As shown in FIG. 5F, the photoresist 576 and the dry patterned transfer layer 574 are removed in operation 460. Additionally, a chemical mechanical polish (CMP) may be performed in operation 460.

In operation 470, a second nonmagnetic cap layer 584 is deposited on the first nonmagnetic cap layer 582. As shown in FIG. 5E, the first nonmagnetic cap layer 582 and the second nonmagnetic cap layer 584 are deposited on both the stencil 590 and the RSBs 546. As shown in FIG. 5G, both the TMR sensor 501 and the first nonmagnetic cap layer 582 are covered by the second nonmagnetic cap layer 584. The second nonmagnetic cap layer 584 and the first nonmagnetic cap layer 582 form a nonmagnetic cap 560 over the RSB 546.

The thickness of the second nonmagnetic cap layer 584 in the z-direction may range from 1 nm to 5 nm. The second nonmagnetic cap layer 584 may be silicon oxide ($SiO_2$), silicon nitride (SiN), or other materials that are removed via a reactive ion etch with a second chemistry. The second chemistry is different from the first chemistry. In one embodiment, the first nonmagnetic cap layer 582 is carbon and the second nonmagnetic cap layer 584 is silicon.

The etch selectivity of the first nonmagnetic cap layer 582 to the second nonmagnetic cap layer 584 may be a:b for a first chemistry and x:y for a second chemistry, where a is greater than b and y is greater than x. In one embodiment, the first chemistry is $CO_2$ and the second chemistry is $CF_3$. When the first chemistry is $CO_2$, a may be 20 and b may be 1. When the second chemistry is $CF_3$, x may be 1 and y may be 3.

Without being limited to theory, the overall thicknesses of the first nonmagnetic cap layer 582 and the second nonmagnetic cap layer 584 may be relatively thin so as to not introduce topography in the DFL read head 500.

Figure 6:
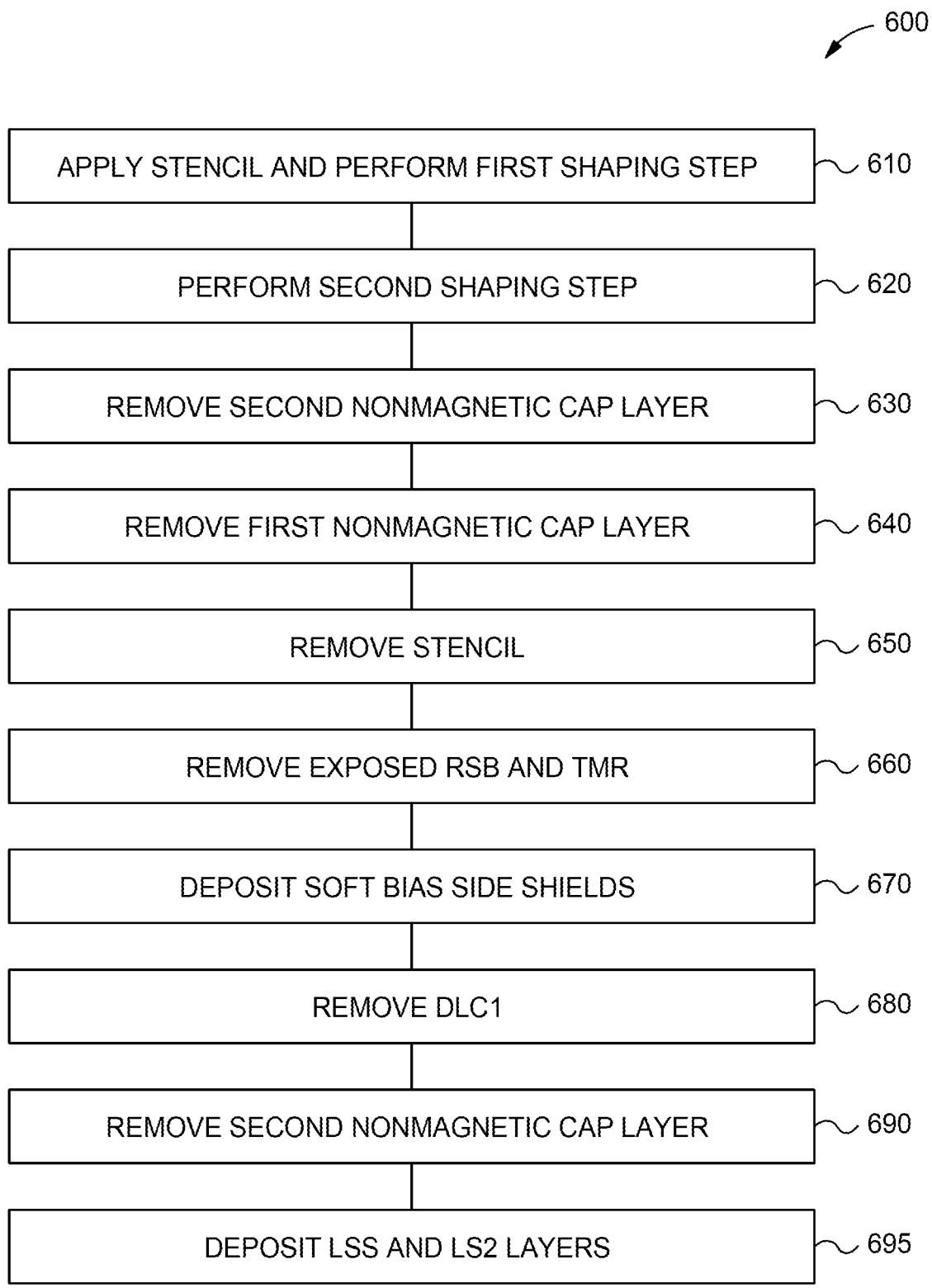
FIG. 6 is a flowchart illustrating a method of forming a DFL read head, according to another embodiment.
Figure 7E:
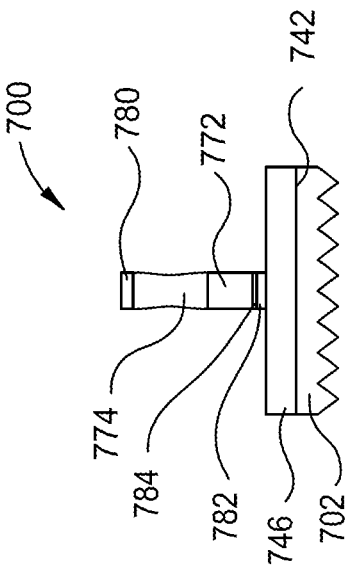
FIGS. 7A-7T illustrate cross-sectional views of various stages of a method of forming a DFL read head, in accordance with one or more embodiments of the present disclosure.

FIG. 6 is a flowchart illustrating a method 600 of forming a DFL read head 700, according to one embodiment. FIGS. 7A-7T illustrate cross-sectional views of various stages of the method 600 of forming the DFL read head 700, in accordance with one or more embodiments of the present disclosure. FIGS. 7A, 7C, 7E, 7G, 7I, 7K, 7M, 7O, 7Q, and 7S illustrate the RSB region of the DFL read head 700 during method 600. FIGS. 7B, 7D, 7F, 7H, 7J, 7L, 7N, 7P, 7R, and 7T illustrate the TMR region of the DFL read head 700 during method 600. Method 600 may be a continuation of the processing operations of method 400, and thus, methods 400 and 600 may be used in combination.

The DFL read head 700 may be the DFL read head 500 of FIGS. 5A-5G or the DFL read head 300 of FIGS. 3A-3B. As such, the TMR sensor 701 may be the TMR sensor 501 or the DFL sensor 301, the lower shield 702 may be the lower shield 502 or the first shield 302, the RSB 746 may be the RSB 546 or the RB 346, the RSB insulation layer 742 may be the RSB insulation layer 542 or the second insulation layer 342, the first nonmagnetic cap layer 782 may be the first nonmagnetic cap layer 582, the second nonmagnetic cap layer 784 may be the second nonmagnetic cap layer 584, the capping layer 712 may be the capping layer 312, and the nonmagnetic cap 760 may be the nonmagnetic cap 560 or the nonmagnetic layer 360. The DFL read head 700 may correspond to, or be a part of, the read/write head 200 described in FIG. 2, such as the magnetic read head 211. It is noted that the seed layer (depicted as seed layer 304 in FIGS. 3A-3B), which is between the lower shield 702 and the TMR sensor 701, is not shown in FIGS. 7A-7T.

FIG. 7A illustrates the RSB region (i.e. the RSB 746 and the nonmagnetic cap 760 comprising the second nonmagnetic cap layer 784 and the first nonmagnetic cap layer 782) of the DFL read head 700 after operation 610, and FIG. 7B illustrates the TMR region comprising the TMR sensor 701 of the DFL read head 700 after operation 610.

In FIG. 7A, the patterned photoresist layer 776 is disposed on the stencil 790, the stencil 790 is disposed on the nonmagnetic cap 760, the nonmagnetic cap 760 is disposed on the RSB 746, the RSB is disposed on the RSB insulation layer 742, and the RSB insulation layer 742 is disposed on the lower shield 702. The nonmagnetic cap 760 includes a second nonmagnetic cap layer 784 disposed on a first nonmagnetic cap layer 782.

In FIG. 7B, the patterned photoresist layer 776 is disposed on the stencil 790, the stencil 790 is disposed on the second nonmagnetic cap layer 784, the second nonmagnetic cap layer 784 is disposed on the TMR cap 712, the capping layer is disposed on the TMR sensor 701, and the TMR sensor 701 is disposed on the lower shield 702.

In operation 610 of method 600, a stencil 790 is applied to a nonmagnetic cap 760 and a TMR sensor 701. After the application of the stencil 790, a patterned photoresist layer 776 is applied to the stencil 790. Additionally, in operation 610, a first shaping step is performed, as discussed below. In FIG. 7A, the stencil 790 is deposited on the nonmagnetic cap 760. As shown in FIG. 7B, the stencil 790 is also applied to the TMR sensor 701. The stencil 790 includes a silicon hard mask (SiHM) 780, a dry patterned transfer layer 774, and a diamond-like carbon (DLC1) layer 772. It is contemplated that the stencil 790 is formed from different layers. In some embodiments, the stencil 790 may be formed via non-photoresist methods such as sidewall deposition, nanoimprint, line doubling, sidewall patterning, or other methods of forming a stencil.

The first shaping step in operation 610 is performed to shape the SiHM 780 to the desired width 780x for both the RSB region and the TMR region. The desired width 780x of the SiHM 780 corresponds to the eventual desired width of the RSB 746 and TMR sensor 701. The desired width 780x of the SiHM 780 may range from 10 nm to 30 nm. During the first shaping step, part of the dry patterned transfer layer 774 is etched away, as shown in FIGS. 7A-7B. The first shaping step in operation 610 may be a fluorine-containing RIE ($CHF_3$, $CF_4$, $SF_6$). In other embodiments, the first shaping step may be ion milling, chemical etchant, or other shaping process.

The patterned photoresist layer 776 may be a JSR 3001 photoresist. The thickness of the patterned photoresist layer 776 may range from 50 nm to 200 nm.

The SiHM 780 may be a vacuum deposited oxide, a spin-on oxide, a metal, or other mask material.

The dry patterned transfer layer 774 may be a polyimide such as Durimide™, or another material such as PMMA (polymethyl methacrylate).

The DLC1 layer 772 may be a carbon hard mask. The thickness of the DLC1 layer 772 may range from 20 nm to 100 nm.

The thickness 784z of the second nonmagnetic cap layer 784 may range from 1 nm to 10 nm. The second nonmagnetic cap layer 784 may be the same composition as the second nonmagnetic cap layer 584.

The thickness 782z of the first nonmagnetic cap layer 782 may range from 1 nm to 10 nm. The first nonmagnetic cap layer 782 may be the same composition as the first nonmagnetic cap layer 582.

The TMR cap 712 may be the same composition as the capping layer 312.

The thickness 746z of the RSB 746 may range from 10 nm to 30 nm. The RSB 746 may be the same composition as the RSB 546.

The thickness of the RSB insulation layer 742 in the z-direction may range from 1 nm to 5 nm. The RSB insulation layer 742 may be the same composition as the RSB insulation layer 542.

The thickness of the TMR sensor 701 in the z-direction may range from 10 nm to 30 nm. The TMR sensor 701 may be the same composition as the TMR sensor 501.

In embodiments where the lower shield 502 is used in a lower device or in a single reader device, the thickness 502z of the lower shield 502 may range from 200 nm to 2000 nm. In embodiments where the lower shield 502 is used in an upper device in a TDMR head, the thickness 502z may range from 20 nm to 100 nm. The lower shield 702 may be the same composition as the lower shield 502.

FIG. 7C illustrate the RSB region of the DFL read head 700 after operation 620, and FIG. 7D illustrates the TMR region of the DFL read head 700 after operation 620. In operation 620, the second shaping step is performed. In FIGS. 7C and 7D, the second shaping step removes the patterned photoresist layer 776 from both the RSB region and the TMR region. In other embodiments, the second shaping step does not remove the patterned photoresist layer 776 or removes a portion of the patterned photoresist layer 776. The second shaping step also etches away the uncovered dry patterned transfer layer 774 and DLC1 layer 772 (i.e., the portions of the dry patterned transfer layer 774 and the DLC1 layer 772 which are not disposed under the SiHM 780).

The second shaping step may be a carbon dioxide ($CO_2$) RIE. In one embodiment which may be combined with other embodiments, the second shaping step may be oxygen ($O_2$) RIE.

Figure 7F:
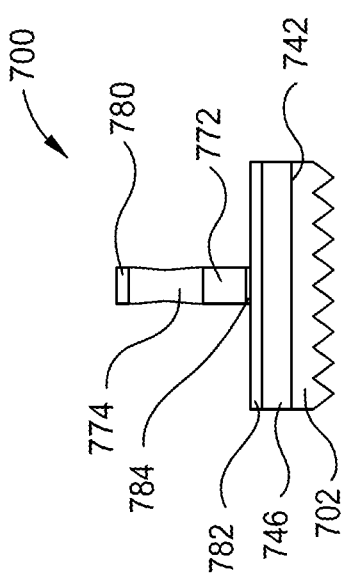

FIG. 7E illustrate the RSB region of the DFL read head 700 after operation 630, and FIG. 7F illustrates the TMR region of the DFL read head 700 after operation 630. In operation 630, the exposed second nonmagnetic cap layer 784 is removed from the RSB portion (i.e., the second nonmagnetic cap layer 784 that is not disposed under the SiHM 780) such that the remaining second nonmagnetic cap layer 784 has the same width 780x as the SiHM 780. As shown in FIGS. 7C and 7E, the first nonmagnetic cap layer 782 and the TMR cap 712 are not affected by operation 630, but the second nonmagnetic cap layer 784 is removed except for under the SiHM 780.

Operation 630 may be performed via an ion mill, a sputter etch (S/E), a high bias RIE, or a combination thereof.

Figure 7G:
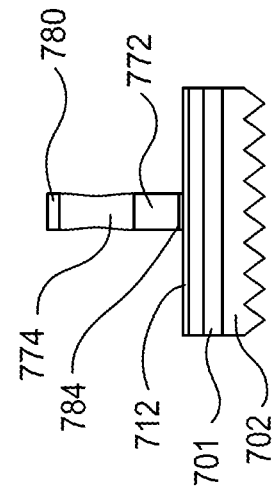
Figure 7H:
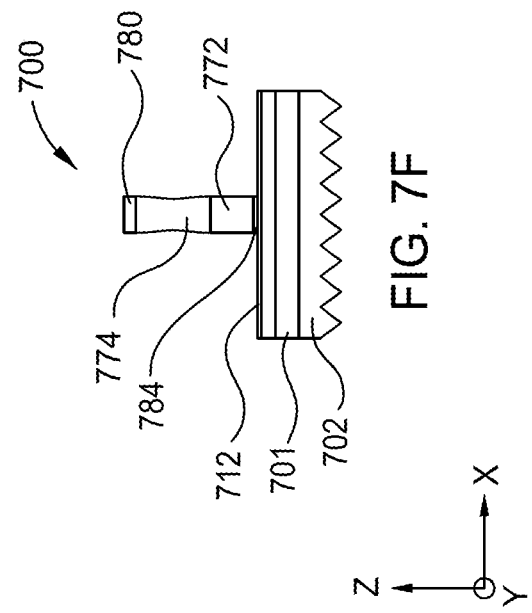

FIG. 7G illustrate the RSB region of the DFL read head 700 after operation 640, and FIG. 7H illustrates the TMR region of the DFL read head 700 after operation 640. In operation 640, the exposed first nonmagnetic cap layer 782 is removed from the RSB portion (i.e., the first nonmagnetic cap layer 782 that is not disposed under the SiHM 780) such that the remaining first nonmagnetic cap layer 782 has the same width 780x as the SiHM 780.

Operation 640 may be performed via an RIE. In embodiments where a RIE is used, the chemistry of the RIE is chosen based on the ion's ability to etch the first nonmagnetic cap layer 782. In one embodiment, operation 640 may be performed via a CO2 RIE. It is contemplated that operation 640 may also be performed via an RIE utilizing oxygen ($O_2$), chlorine ($Cl_2$), or any combination thereof.

FIG. 7I illustrate the RSB region of the DFL read head 700 after operation 650, and FIG. 7J illustrates the TMR region of the DFL read head 700 after operation 650. In operation 650, the stencil 790 is removed from both the RSB portion and the TMR portion. In one embodiment, wet chemistry is used to remove the stencil 790. In one embodiment, n-methyl-2-pyrrolidone (NMP) is used to remove the stencil 790. Upon removing the stencil 790, only the first nonmagnetic cap layer 782, the second nonmagnetic cap layer 784, and the DLC1 layer 772 remain on the RSB 746, and only the DLC1 layer 772, the second nonmagnetic cap layer 784, and the TMR cap 712 remain on the TMR sensor 701.

FIG. 7K illustrate the RSB region of the DFL read head 700 after operation 660, and FIG. 7L illustrates the TMR region of the DFL read head 700 after operation 660. In operation 660, the exposed RSB 746, the exposed TMR cap 712, and the exposed TMR sensor 701 are removed (i.e., the RSB 746, the TMR cap 712, and the TMR sensor 701 that are not disposed under the DLC1 layer 772) via an ion milling process. It is contemplated that the exposed RSB 746 and the exposed TMR sensor 701 are removed simultaneously.

As shown in FIGS. 7K-7L, operation 660 also removes some of the DLC1 layer 772. The ion milling process may be performed utilizing argon (Ar), krypton (Kr), or xenon (Xe)

FIG. 7M illustrate the RSB region of the DFL read head 700 after operation 670, and FIG. 7N illustrates the TMR region of the DFL read head 700 after operation 670. In operation 670, soft bias side shields 714a, 714b, 715a, 715b (collectively referred to as 714) are deposited. In one embodiment that may be combined with other embodiments, the soft bias shields 714 may be deposited by: depositing lower soft bias side shields 714a, 714b, performing a tip milling process, depositing a spacer 718a, 718b on the lower soft bias side shields 714a, 714b, depositing upper soft bias side shields 715a, 715b on the spacer 718a, 718b, and performing a mill open (MLOP) step. It is contemplated that other methods of depositing soft bias side shields 714 may be performed.

FIG. 7O illustrate the RSB region of the DFL read head 700 after operation 680, and FIG. 7P illustrates the TMR region of the DFL read head 700 after operation 680. In operation 680, the DLC1 layer 772 is removed from both the RSB portion and the TMR portion. Operation 680 may be performed via a field RIE. Without being limited by theory, the second nonmagnetic cap layer 784 protects the first nonmagnetic cap layer 782 from being removed during operation 680 for the RSB portion. Since the nonmagnetic cap 760 is not removed during this process, magnetic separation of the RSB 746 is maintained.

FIG. 7Q illustrate the RSB region of the DFL read head 700 after operation 690, and FIG. 7R illustrates the TMR region of the DFL read head 700 after operation 690. In operation 690, the second nonmagnetic cap layer 784 is removed. During operation 690, some of the upper soft bias side shields 715a, 715b and the TMR cap 712 may also be removed. Operation 690 may be performed via an ion mill or sputter etch process.

FIG. 7S illustrate the RSB region of the DFL read head 700 after operation 695, and FIG. 7T illustrates the TMR region of the DFL read head 700 after operation 695. In operation 695, a laminated shared shield (LSS) layer 722 and a laminated shield 2 (LS2) layer 724 are deposited. Operation 695 may be performed via any sputtering process. The LSS layer 722 may be the LSS layer 322 from FIG. 3.

The LSS layer 722 and the LS2 layer may consist of a magnetic layer which is stabilized by iridium manganese (IrMn) or another antiferromagnetic compound such as platinum manganese (PtMn), iridium manganese chromium (IrMnCr), nickel manganese (NiMn), or any combination thereof.

Figure 8:
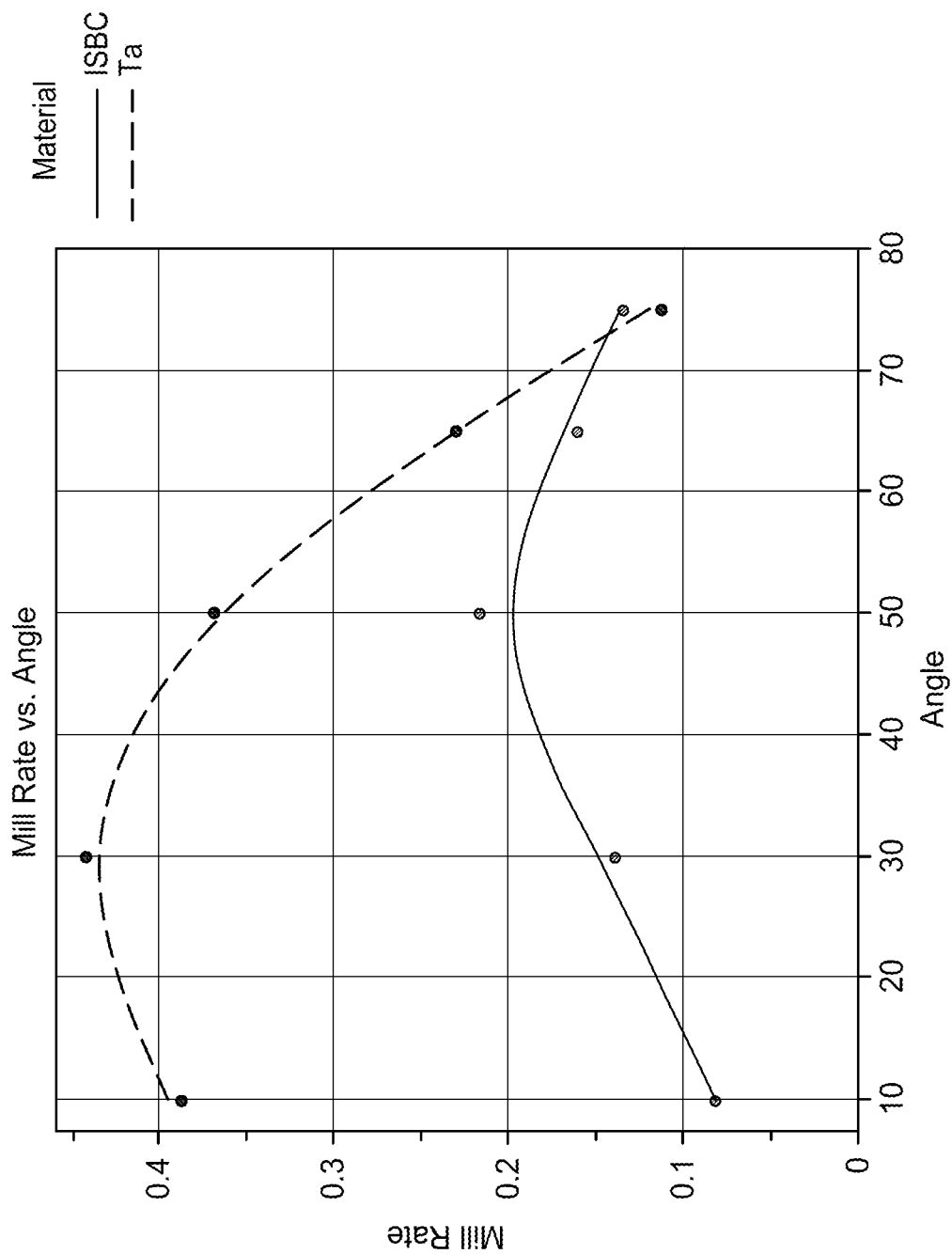
FIG. 8 illustrates a graph of normalized milling rates versus milling angles for various materials, according to various embodiments.

FIG. 8 illustrates a graph of normalized milling rates versus milling angles for various materials, according to various embodiments. In FIG. 8, the milling rate of tantalum (Ta) is shown compared to ion beam sputtered carbon (IBSC). The graph in FIG. 8 shows that at an angle of 20°, the mill rate for IBSC is roughly a quarter of the rate of milling of Ta. Therefore, a cap made of IBSC is able to better withstand the milling operations described above than a cap made of Ta.

Thus, a nonmagnetic cap comprising an RIE-able material may be utilized as an improved RSB cap. This nonmagnetic cap allows for the nonmagnetic cap to be removed prior to the milling of the RSB and the TMR sensor. This nonmagnetic cap can also be deposited with a relatively small thickness, so as to not introduce topography in the DFL sensor. Additionally, this nonmagnetic cap allows for greater flexibility of materials in the RSB stack since it will be removed prior to milling of the RSB and TMR sensor.

In one embodiment, a method of forming a dual free layer (DFL) read head, comprising applying a stencil on a tunnel magneto resistance (TMR) sensor; removing a portion of the TMR sensor; depositing a rear soft bias (RSB) insulation layer over the stencil and a seed layer; depositing an RSB over the RSB insulation layer; milling the RSB to aid a liftoff process; depositing a first nonmagnetic cap layer over the RSB, wherein the first nonmagnetic cap layer is removable via a reactive ion etch process; and removing the stencil.

In another embodiment the method, wherein the removing the portion of the TMR sensor comprises utilizing an ion mill to define a first depth of the TMR sensor.

In another embodiment, the method, further comprising depositing an etch stop layer on the RSB prior to depositing the first nonmagnetic cap layer over the RSB.

In another embodiment, the method, wherein the first nonmagnetic cap layer comprises ruthenium and the etch stop layer comprises tantalum.

In yet another embodiment, the method, further comprising depositing a second nonmagnetic cap layer on the first nonmagnetic cap layer after removing the stencil.

In another embodiment, the method, wherein the first nonmagnetic cap layer comprises carbon and the second nonmagnetic cap layer comprises silicon.

In another embodiment, the method, further comprising depositing a DLC layer on the first nonmagnetic cap layer; depositing a stencil over the DLC layer, the stencil comprising a dry patterned transfer layer and a silicon hard mask; depositing a photoresist over the stencil; shaping the stencil; removing a portion of the first nonmagnetic cap layer; and removing the stencil.

In yet another embodiment, the method, further comprising removing a portion of the RSB to define a width of the RSB; depositing one or more soft bias side shields; and removing the DLC layer.

In another embodiment, a magnetic recording device comprising a DFL read head formed by the method.

In one embodiment, a method of forming a dual free layer (DFL) read head, comprising forming a rear soft bias (RSB)

portion, the RSB portion comprising a nonmagnetic cap; depositing a stencil over the nonmagnetic cap, the stencil comprising a dry patterned transfer layer and a hard mask; shaping the stencil to define a width of the RSB; removing a portion of the nonmagnetic cap; and removing the stencil.

In another embodiment, the method, wherein the shaping the stencil comprises a fluorine reactive ion etch.

In yet another embodiment, the method, wherein the dry patterned transfer layer is polyimide.

In another embodiment, the method, further comprising: removing a portion of the RSB; removing a portion of a tunnel magneto resistance (TMR) sensor disposed adjacent to the RSB; and depositing one or more soft bias side shields adjacent to the TMR and the RSB.

In another embodiment, the method, wherein the removing the portion of the nonmagnetic cap comprises a carbon dioxide reactive ion etch.

In another embodiment, the method, wherein the removing the portion of the RSB and the removing a portion of the TMR sensor occurs simultaneously.

In another embodiment, a magnetic recording device comprising a DFL read head formed by the method.

In one embodiment, a dual free layer (DFL) read head, comprising: a tunnel magneto resistance (TMR) sensor disposed at a media facing surface (MFS); soft bias (SB) side shields disposed adjacent to the TMR sensor at the MFS; and a rear soft bias (RSB) disposed adjacent to the TMR sensor recessed from the MFS. The RSB having a nonmagnetic cap, the nonmagnetic cap comprising: a first nonmagnetic cap layer; and a second nonmagnetic cap layer, wherein an etch selectivity of the first nonmagnetic cap layer to the second nonmagnetic cap layer is a ratio of a:b in a first chemistry and a ratio of x:y in a second chemistry, wherein a is greater than b, and y is greater than x, and the second nonmagnetic cap layer is disposed on the first nonmagnetic cap layer.

In another embodiment, the DFL read head, wherein the first nonmagnetic cap layer comprises carbon and the second nonmagnetic cap layer comprises silicon.

In yet another embodiment, the DFL read head, wherein the TMR sensor has a first thickness and the RSB has a second thickness, wherein the second thickness is greater than or equal to the first thickness.

In another embodiment, the DFL read head, wherein the SB side shields are adjacent to the RSB.

In yet another embodiment, the DFL read head, wherein the first nonmagnetic cap layer comprises tantalum and the second nonmagnetic cap layer comprises ruthenium.

In another embodiment, a magnetic recording device comprising the DFL read head.

While the foregoing is directed to embodiments of the present disclosure, other and further embodiments of the disclosure may be devised without departing from the basic scope thereof, and the scope thereof is determined by the claims that follow.

What is claimed is:

1. A dual free layer (DFL) read head, comprising:
a tunnel magneto resistance (TMR) sensor disposed at a media facing surface (MFS);
soft bias (SB) side shields disposed adjacent to the TMR sensor at the MFS; and
a rear soft bias (RSB) disposed adjacent to the TMR sensor recessed from the MFS, the RSB having a nonmagnetic cap, the nonmagnetic cap comprising:
a first nonmagnetic cap layer; and
a second nonmagnetic cap layer, the second nonmagnetic cap layer being disposed on the first nonmagnetic cap layer, wherein an etch selectivity of the first nonmagnetic cap layer to the second nonmagnetic cap layer is a ratio of a:b in a first chemistry and a ratio of x:y in a second chemistry, wherein a is greater than b, and y is greater than x, wherein the first nonmagnetic cap layer comprises carbon and the second nonmagnetic cap layer comprises silicon, or wherein the first nonmagnetic cap layer comprises tantalum and the second nonmagnetic cap layer comprises ruthenium.

2. The DFL read head of claim 1, wherein the first nonmagnetic cap layer comprises carbon and the second nonmagnetic cap layer comprises silicon.

3. The DFL read head of claim 1, wherein the TMR sensor has a first thickness and the RSB has a second thickness, wherein the second thickness is greater than or equal to the first thickness.

4. The DFL read head of claim 1, wherein the SB side shields are adjacent to the RSB.

5. The DFL read head of claim 1, wherein the first nonmagnetic cap layer comprises tantalum and the second nonmagnetic cap layer comprises ruthenium.

6. The DFL read head of claim 1, wherein the first chemistry is $CO_2$ and the second chemistry is $CF_3$.

7. The DFL read head of claim 6, wherein a is 20, b is 1, x is 1, and y is 3.

8. A magnetic recording device comprising the DFL read head of claim 1.

9. A dual free layer (DFL) read head, comprising:
a tunnel magneto resistance (TMR) sensor disposed at a media facing surface (MFS);
soft bias (SB) side shields disposed adjacent to the TMR sensor at the MFS; and
a rear soft bias (RSB) disposed adjacent to the TMR sensor recessed from the MFS, the RSB having a nonmagnetic cap, the nonmagnetic cap comprising:
a carbon layer; and
a silicon layer disposed on the carbon layer.

10. A magnetic recording device comprising the DFL read head of claim 9.

11. The DFL read head of claim 9, wherein an etch selectivity of the carbon layer to the silicon layer is a ratio of a:b in a first chemistry and a ratio of x:y in a second chemistry, wherein a is greater than b, and y is greater than x.

12. The DFL read head of claim 11, wherein the first chemistry is $CO_2$ and the second chemistry is $CF_3$.

13. The DFL read head of claim 12, wherein a is 20, b is 1, x is 1, and y is 3.

14. The DFL read head of claim 9, wherein the SB side shields are adjacent to the RSB.

15. A dual free layer (DFL) read head, comprising:
a tunnel magneto resistance (TMR) sensor disposed at a media facing surface (MFS);
soft bias (SB) side shields disposed adjacent to the TMR sensor at the MFS; and
a rear soft bias (RSB) disposed adjacent to the TMR sensor recessed from the MFS, the RSB having a nonmagnetic cap, the nonmagnetic cap comprising:
a tantalum layer; and
a ruthenium layer disposed on the tantalum layer.

16. The DFL read head of claim 15, wherein an etch selectivity of the tantalum layer to the ruthenium layer is a ratio of a:b in a first chemistry and a ratio of x:y in a second chemistry, wherein a is greater than b, and y is greater than x.

17. The DFL read head of claim 16, wherein the first chemistry is $CO_2$ and the second chemistry is $CF_3$.

18. The DFL read head of claim 17, wherein a is 20, b is 1, x is 1, and y is 3.

19. The DFL read head of claim 15, wherein the SB side shields are adjacent to the RSB.

20. A magnetic recording device comprising the DFL read head of claim 15.

* * * * *